US012565606B2

(12) United States Patent
Ogino et al.

(10) Patent No.: US 12,565,606 B2
(45) Date of Patent: Mar. 3, 2026

(54) ADHESIVE SHEET

(71) Applicant: TERAOKA SEISAKUSHO CO., LTD., Tokyo (JP)

(72) Inventors: Shohei Ogino, Tokyo (JP); Kazuki Ishikawa, Tokyo (JP); Yuuki Iwakami, Tokyo (JP); Yasushi Tsuchiya, Tokyo (JP)

(73) Assignee: TERAOKA SEISAKUSHO CO., LTD., Tokyo (JP)

( * ) Notice: Subject to any disclaimer, the term of this patent is extended or adjusted under 35 U.S.C. 154(b) by 158 days.

(21) Appl. No.: 18/546,968

(22) PCT Filed: Feb. 19, 2021

(86) PCT No.: PCT/JP2021/006368
§ 371 (c)(1),
(2) Date: Aug. 17, 2023

(87) PCT Pub. No.: WO2022/176161
PCT Pub. Date: Aug. 25, 2022

(65) Prior Publication Data
US 2024/0132761 A1    Apr. 25, 2024
US 2024/0228844 A9    Jul. 11, 2024

(51) Int. Cl.
*C09J 163/00*        (2006.01)

(52) U.S. Cl.
CPC .................................. *C09J 163/00* (2013.01)

(58) Field of Classification Search
CPC ...................................................... C09J 163/00
(Continued)

(56) References Cited

U.S. PATENT DOCUMENTS 5,585,178 A    12/1996    Calhoun et al.
5,593,759 A    1/1997    Vargas et al.
(Continued)

FOREIGN PATENT DOCUMENTS

JP        H0314888 A    1/1991
JP        2007518865 A    7/2007
(Continued)

OTHER PUBLICATIONS

Rasa, Alexander "Applying dynamic mechanical analysis to research & development for viscoelastic damping materials" Pyrotek Noise Control, Australia from inter.noise 2014 Melbourne Australia Nov. 16-19, from: https://acoustics.asn.au/conference_proceedings/INTERNOISE2014/papers/p426.pdf (Year: 2014).*
(Continued)

*Primary Examiner* — Abbas Rashid
*Assistant Examiner* — Wayne K. Swier
(74) *Attorney, Agent, or Firm* — Law Office of Katsuhiro Arai

(57) ABSTRACT

The adhesive sheet includes an adhesive layer (A1L) in solid form at 18° C., wherein the adhesive layer (A1L) contains an epoxy resin, at least one surface of the adhesive layer (A1L) has a tackiness agent region (A2R) formed by partially providing a tackiness agent (A2), and a region where the tackiness agent region (A2R) is not formed on the surface is an adhesive-layer-exposed region (A1LR) where a surface of the adhesive layer (A1L) is exposed. This adhesive sheet has excellent temporary fixability at the time of sticking (a characteristic that exhibits the tackiness force necessary for temporary fixation) and adhesive force after heat curing.

8 Claims, 2 Drawing Sheets

(58) Field of Classification Search
USPC ......................................................... 264/234
See application file for complete search history.

(56) References Cited

U.S. PATENT DOCUMENTS

| | | | |
|---|---|---|---|
| 6,565,969 B1 | 5/2003 | Lamon et al. | |
| 2003/0011738 A1* | 1/2003 | Akiyama ................. | H01L 24/29 |
| | | | 257/E27.111 |
| 2008/0251201 A1 | 10/2008 | Sikkel et al. | |
| 2012/0223455 A1* | 9/2012 | Shintani ................. | H05K 3/007 |
| | | | 264/293 |
| 2012/0237764 A1* | 9/2012 | Soejima .................... | C09J 9/00 |
| | | | 428/343 |
| 2014/0074005 A1* | 3/2014 | Patel .......................... | C09J 5/08 |
| | | | 602/54 |
| 2016/0230047 A1 | 8/2016 | Varn et al. | |
| 2018/0134926 A1 | 5/2018 | Lei et al. | |
| 2019/0194497 A1 | 6/2019 | Aizawa et al. | |
| 2023/0141703 A1* | 5/2023 | Shimada .................... | C09J 7/38 |
| | | | 428/327 |

FOREIGN PATENT DOCUMENTS

| | | | | | |
|---|---|---|---|---|---|
| JP | 2008266456 A | * | 11/2008 | ............. | H01G 4/308 |
| JP | 2016084470 A | | 5/2016 | | |
| JP | 2017005160 A | | 1/2017 | | |
| JP | 2017203114 A | | 11/2017 | | |
| KR | 20170082489 A | * | 7/2017 | ............... | C08J 9/32 |
| WO | 2016163514 A1 | | 10/2016 | | |

OTHER PUBLICATIONS

Machine translation KR20170082489A (Year: 2017).*
McHone Industries, Inc. "SS vs. SUS . . . Is There a Difference? Yes and No" Dec. 13, 2020; https://www.mchoneind.com/blog/ss-vs-sus (Year: 2020).*
Machine translation JP2008266456A (Year: 2008).*
International Search Report (ISR) mailed Apr. 27, 2021, issued for International application No. PCT/JP2021/006368. (3 pages).
Extended European Search Report (EESR) dated Feb. 21, 2024, issued for European counterpart patent application No. EP21926594.9 (7 pages).

* cited by examiner ( a )

( b )

ADHESIVE SHEET

TECHNICAL FIELD

The present invention relates to an adhesive sheet that is excellent in temporary fixability while maintaining stable and high adhesive strength after heat curing.

BACKGROUND ART

Epoxy resin-based adhesives have excellent heat resistance and strong adhesiveness, and are thus widely used in applications such as member adhesion and structure adhesion.

Meanwhile, it is sometimes necessary to fill narrow sections of industrial components with adhesives. In this case, a method is known in which adhesive sheets made of adhesives containing thermosensitive foaming agents, or adhesive sheets having layers of such adhesives on both surfaces or a single surface of substrates, are inserted into narrow sections, and the narrow sections are filled with the adhesives by heating and foaming them.

PTL 1 describes an adhesive sheet used for applications where gaps (narrow sections) are filled with epoxy-based adhesives. It describes that, in a case where a releasing agent is applied to the surface of the adhesive layer of this adhesive sheet (that is, in a case where a releasing agent layer is formed), the workability when inserting the adhesive sheet into gaps is improved.

PTL 2 also describes an adhesive sheet used for applications where gaps (narrow sections) are filled with epoxy-based adhesives. It describes that, in a case where the surface of the adhesive layer is covered with a coat layer that exhibits no tack at normal temperature, the adhesive layer can be prevented from being cracked and falling off.

The releasing agent layer in PTL 1 and the coat layer in PTL 2 mix with the adhesive layer and disappear when the adhesive sheet is inserted into gaps and then heated to foam. Therefore, the adhesion performance of the adhesive is considered to be not so inhibited.

CITATION LIST

Patent Literature

PTL 1: International Publication No. WO 2016/163514
PTL 2: Japanese Patent Application Laid-Open No. 2016-084470

SUMMARY OF INVENTION

Technical Problem

The present inventors have focused on the point that, in the applications described above, it is preferable to temporarily fix an adhesive sheet having an epoxy-based adhesive layer to the desired site, then insert it into the narrow section, and heat and foam it while stabilizing its position.

For example, if a liquid epoxy resin is used to impart a tack property to the epoxy-based adhesive layer, the temporary fixation mentioned above is enabled. However, since liquid epoxy resins generally have poor heat resistance, the adhesive layer containing a liquid epoxy resin has reduced heat resistance, restricting the environment in which the adhesive sheet can be used. In addition, since the variety of commercially available liquid epoxy resins is limited, the range of material selection is narrow. Moreover, the hardness of the adhesive layer is decreased and the shape stability is also decreased along with it, and thus, for example, the adhesive may stick out from the end surface when winding up the adhesive sheet.

Furthermore, even if a tack property is given to the epoxy-based adhesive layer, when the releasing agent layer of PTL 1 or the coat layer of PTL 2, which exhibits no tack, is uniformly provided over the adhesive layer, temporary fixation is not possible.

An object of the present invention is to provide an adhesive sheet that is excellent in temporary fixability (a characteristic that exhibits the tackiness force necessary for temporary fixation) while maintaining stable and high adhesive strength after heat curing.

Solution to Problem

As a result of diligent investigations in order to achieve the object described above, the present inventors have found that it is effective to partially provide a tackiness agent region (A2R) on the surface of an adhesive layer (A1L), which is in solid form at the ambient temperature when handled, thereby completing the present invention.

That is, the present invention is an adhesive sheet comprising an adhesive layer (A1L) in solid form at 18° C., wherein the adhesive layer (A1L) contains an epoxy resin, at least one surface of the adhesive layer (A1L) has a tackiness agent region (A2R) formed by partially providing a tackiness agent (A2), and a region where the tackiness agent region (A2R) is not formed on the surface is an adhesive-layer-exposed region (A1LR) where a surface of the adhesive layer (A1L) is exposed.

Advantageous Effects of Invention

In the present invention, by partially providing a tackiness agent region (A2R) on the surface of an adhesive layer (A1L), which is in solid form at the ambient temperature when handled, it is possible to provide an adhesive sheet that is excellent in temporary fixability (a characteristic that exhibits the tackiness force necessary for temporary fixation) while maintaining stable and high adhesive strength after heat curing.

DESCRIPTION OF EMBODIMENTS

Figure 1:
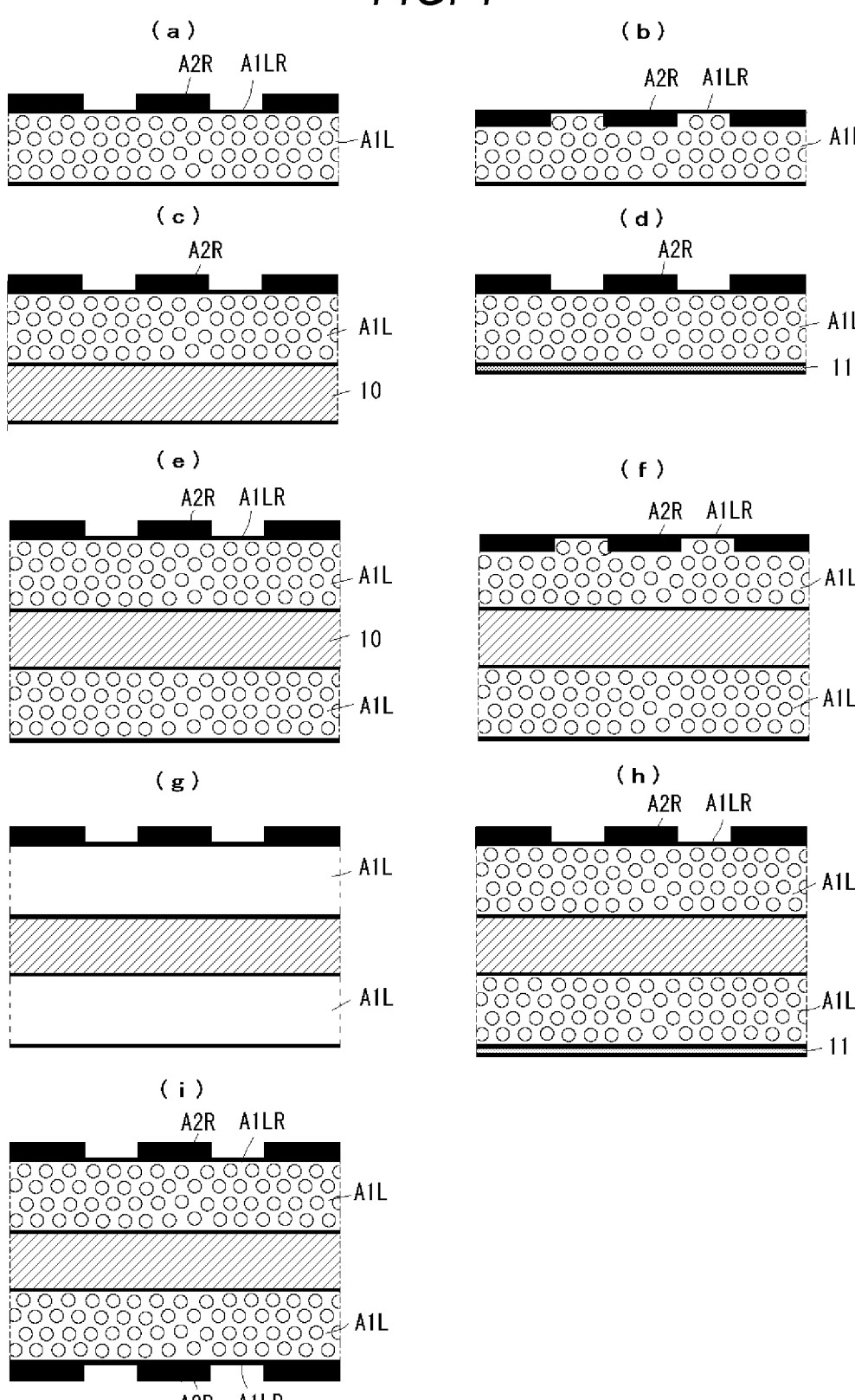
FIG. 1 is a schematic cross-sectional view showing embodiments of the adhesive sheet of the present invention.

Hereinafter, embodiments of the present invention will be described with reference to FIG. 1(a) to (i).

The embodiment shown in FIG. 1(a) is an adhesive sheet in which one surface of an adhesive layer (A1L) has a tackiness agent region (A2R) and an adhesive-layer-exposed region (A1LR).

In FIG. 1(a), the adhesive layer (A1L) is a layer formed from the adhesive (A1), specifically containing an epoxy resin. Also, this adhesive layer (A1L) further contains a foaming agent (preferably a thermosensitive foaming agent). The adhesive sheet in FIG. 1(a) is a baseless type adhesive sheet that does not have a substrate and is composed mainly of the adhesive layer (A1L).

In FIG. 1(a), the tackiness agent region (A2R) is a region formed by partially providing the tackiness agent (A2) on one surface of the adhesive layer (A1L). The outer surface of the tackiness agent region (A2R) in FIG. 1(a) protrudes outward compared to the outer surface of the adhesive-layer-exposed region (A1LR). This protrusion of the outer surface of the tackiness agent region (A2R), for example, tends to allow air to escape through the space above the adhesive-layer-exposed region (A1LR) at the time of sticking (temporary fixation) of the adhesive sheet, thereby preventing occurrence of air pockets on the sticking surface. The height from the outer surface of the adhesive-layer-exposed region (A1LR) to the outer surface of the tackiness agent region (A2R) is preferably 1 to 10 µm, and more preferably 1 to 5 µm.

In FIG. 1(a), the adhesive-layer-exposed region (A1LR) is defined as a region where the tackiness agent region (A2R) is not formed on the surface of the adhesive layer (A1L) on the side where the tackiness agent region (A2R) is formed.

Since the adhesive sheet of the present invention has the tackiness agent region (A2R), temporary fixation is possible before heating and foaming, regardless of the physical properties (for example, tack property) of the adhesive layer (AIL). Moreover, since the adhesive sheet has the adhesive-layer-exposed region (A1LR), the adhesive layer (AIL) foams when heated, and the swollen adhesive layer (A1L) comes into contact with the adherend. As a result, stable and high adhesive strength is developed after heating and foaming.

The embodiment shown in FIG. 1(b) is an adhesive sheet in which the outer surface of the tackiness agent region (A2R) and the outer surface of the adhesive-layer-exposed region (A1LR) are present in substantially the same plane. Note that, in the present invention, "substantially the same plane" is meant to encompass cases where dimensional variations due to production errors in each region occur in a case of attempting to produce them in the same plane. The outer surface of the tackiness agent region (A2R) in FIG. 1(a) previously mentioned protrudes outward compared to the outer surface of the adhesive-layer-exposed region (A1LR), but the present invention is not limited to this and may be configured as shown in this FIG. 1(b). As shown in FIG. 1(b), the outer surfaces of both regions are present in substantially the same plane, which improves the close adhesion between the adhesive layer (A1L) and the tackiness agent region (A2R), and prevents the tackiness agent region from falling off, for example.

The embodiment shown in FIG. 1(c) is an adhesive sheet in which one surface of the adhesive layer (A1L) has the tackiness agent region (A2R) and another surface of the adhesive layer (A1L) has a substrate 10. The adhesive sheet in FIG. 1(a) previously mentioned has nothing on the surface of the adhesive layer (A1L) different from the surface having the tackiness agent region (A2R), but the present invention is not limited to this and may have a substrate 10 as shown in this FIG. 1(c). This embodiment shown in FIG. 1(c) is one of the preferred embodiments. When the adhesive sheet has the substrate 10, for example, the strength and shape retainability of the adhesive sheet are improved.

The embodiment shown in FIG. 1(d) is an adhesive sheet in which one surface of the adhesive layer (A1L) has the tackiness agent region (A2R) and another surface of the adhesive layer (A1L) has a releasing layer 11. The adhesive sheet in FIG. 1(a) previously mentioned has nothing on the surface of the adhesive layer (A1L) different from the surface having the tackiness agent region (A2R), but the present invention is not limited to this and may have a releasing layer 11 as shown in this FIG. 1(d). This embodiment shown in FIG. 1(d) is one of the preferred embodiments. When the adhesive sheet has the releasing layer 11, for example, the adhesive sheet tends to have improved slidability when inserted into a narrow section, making it easier to insert.

In the embodiments shown in FIG. 1(a) to (d) above, the adhesive layer (A1L) also contains a foaming agent (preferably a thermosensitive foaming agent). When the adhesive layer (A1L) contains a foaming agent, for example, the adhesive tends to fill a wider range due to the foaming phenomenon. However, the present invention is not limited to this, and the adhesive layer may be free from a foaming agent.

The embodiment shown in FIG. 1(e) is an adhesive sheet in which both surfaces of the substrate 10 have the adhesive layers (A1L). The adhesive sheet in FIG. 1(c) previously mentioned has the adhesive layer (A1L) on one surface of the substrate 10, but the present invention is not limited to this and may have the adhesive layers (A1L) on both surfaces of the substrate 10 as shown in FIG. 1(e). This embodiment shown in FIG. 1(e) is one of the preferred embodiments. Specifically, this adhesive sheet has the adhesive layers (A1L) on both surfaces of the substrate 10, the two adhesive layers (A1L) contain a foaming agent (preferably a thermosensitive foaming agent), and the outer surface of one adhesive layer (A1L) of the two adhesive layers (A1L) has the tackiness agent region (A2R) and the adhesive-layer-exposed region (A1LR). When both surfaces of the substrate 10 have the adhesive layers (A1L), for example, the adhesive layers (A1L) on both surfaces of the substrate 10 foam when heated, and the swollen adhesive layers (A1L) come into contact with the adherend. As a result, stable and high adhesive strength is also developed after heating and foaming.

The embodiment shown in FIG. 1(f) is an adhesive sheet in which the outer surface of the tackiness agent region (A2R) and the outer surface of the adhesive-layer-exposed region (A1LR) are present in substantially the same plane. The outer surface of the tackiness agent region (A2R) in FIG. 1(e) previously mentioned protrudes outward compared to the outer surface of the adhesive-layer-exposed region (A1LR), but the present invention is not limited to this and may be configured as shown in this FIG. 1(f), in a similar manner to the previously mentioned FIG. 1(b). The advantageous points and preferred height of such a configuration are the same as the points and height described for the configuration of FIG. 1(b).

The embodiment shown in FIG. 1(g) is an adhesive sheet in which the adhesive layers (A1L) are free from a foaming agent. The two adhesive layers (A1L) in FIG. 1(e) previously mentioned contain a foaming agent (preferably a thermosensitive foaming agent), but the present invention is not limited to this and the adhesive layers may be free from a foaming agent as shown in this FIG. 1(f). Even in this aspect, in a case where the epoxy resin is fluidized by heating the adhesive sheet, the epoxy resin can reach the adherend from the adhesive-layer-exposed region (A1LR).

The embodiment shown in FIG. 1(h) is an adhesive sheet in which the outer surface of one adhesive layer (A1L) of the two adhesive layers (A1L) has the tackiness agent region (A2R) and the adhesive-layer-exposed region (A1LR), and the outer surface of another adhesive layer (A1L) has the releasing layer 11. The outer surface of the another adhesive layer (A1L) in FIG. 1(e) previously mentioned does not have anything, but the present invention is not limited to this and may have the releasing layer 11 as shown in this FIG. 1(*h*), in a similar manner to the previously mentioned FIG. 1(*d*). The advantageous points of such a configuration are the same as the points described for the configuration of FIG. 1(*d*).

The embodiment shown in FIG. 1(*i*) is an adhesive sheet in which the outer surfaces of the two adhesive layers (A1L) have the tackiness agent regions (A2R) and the adhesive-layer-exposed regions (A1LR). In the adhesive sheet in FIG. 1(*e*) previously mentioned, only one adhesive layer (A1L) has the respective regions, but the present invention is not limited to this and may have the tackiness agent regions (A2R) on both layers as shown in this FIG. 1(*i*).

Next, embodiments of the pattern of the tackiness agent region will be described with reference to FIG. 2(*a*) to (*b*).

The pattern of the tackiness agent region (A2R) is not particularly limited. For example, the pattern may be a regular arrangement of round island-shaped tackiness agent regions (A2R) in horizontal rows at half-displaced positions as shown in FIG. 2(*a*), a regular arrangement of rectangular island-shaped tackiness agent regions (A2R) in vertical rows at equal intervals as shown in FIG. 2(*b*), or a regular arrangement of vertical stripe-shaped tackiness agent regions (A2R) at equal intervals. A pattern with a regular arrangement of tackiness agent regions (A2R) is preferred, but a pattern in which they are randomly intermixed is also acceptable. Examples of other shapes of the tackiness agent region (A2R) include triangular and polygonal shapes.

The width of the tackiness agent region (A2R) is not particularly limited, but is preferably 0.5 to 5 mm, and more preferably 0.5 to 3 mm. Also, the width of the adhesive-layer-exposed region (A1LR) is not particularly limited, but is preferably 0.1 to 3.0 mm, and more preferably 0.1 to 1 mm. Furthermore, in a case where the outer surface of the tackiness agent region (A2R) protrudes outward compared to the outer surface of the adhesive-layer-exposed region (A1LR), the height of the protruding part is not particularly limited, but is preferably 1 to 10 μm, and more preferably 1 to 5 μm.

The proportion of the area of the tackiness agent region (A2R) to the total area (100%) of the area of the tackiness agent region (A2R) and the area of the adhesive-layer-exposed region (A1LR) is preferably 1% to 70%, more preferably 20 to 70%, and particularly preferably 55 to 65%. By providing the tackiness agent region (A2R) in such a proportion, it is possible to obtain temporary fixability (a characteristic that exhibits the tackiness force necessary for temporary fixation) without inhibiting the fluidity of the adhesive at the time of heat curing.

[Adhesive Layer (A1L)]

The adhesive layer (A1L) in the present invention is in solid form at 18° C. and preferably exhibits no tack at 5° C. In the present invention, "solid form" means that the peak temperature of tan δ obtained by the measurement method described below is 18° C. or higher. The peak temperature of tan δ of the adhesive layer (A1L) is preferably 20 to 100° C., and more preferably 40 to 100° C. Also, in the present invention, "exhibiting no tack" means that the evaluation result is that the sheet falls off in the evaluation of low-temperature sticking property, which will be mentioned later. When the adhesive layer (A1L) has these characteristics, the slidability can be improved when inserting the adhesive sheet while the shape stability is improved and the adhesive can be prevented from sticking out at the time of winding.

(Method for Measuring Peak Temperature of Tan δ)

Using a viscoelasticity tester for dynamic viscoelasticity measurement, an adhesive sample with a thickness of about 2 mm was sandwiched between the parallel plates of the measurement section of the tester, and the storage modulus G' and the loss modulus G″ were measured at a frequency of 10 Hz and at −20° C. to 100° C. The tan δ is determined according to the calculation formula of tan δ (loss factor)= G″/G', and the peak temperature is analyzed.

The adhesive layer (A1L) in the present invention contains an epoxy resin. This epoxy resin preferably contains a polyfunctional epoxy resin. The kind of the polyfunctional epoxy resin is not particularly limited, and preferred are novolac type epoxy resins such as a phenol novolac type and a cresol novolac type, or a mixture of these. When the novolac type epoxy resin is used, the glass transition temperature of the cured product is increased, and thus, adhesive force tends to be stable even under a high temperature.

As the epoxy resin, epoxy resins other than the polyfunctional epoxy resin may be used in combination. By using a mixture of the polyfunctional epoxy resin and other epoxy resins, the physical properties of the epoxy resin, such as softening point, melt viscosity, glass transition point, and storage modulus, can be adjusted easily and in detail. In general, when mixed with an epoxy resin with a low softening point or in liquid form, the fluidity at the time of heating and the flexibility before and after curing of the adhesive layer can be enhanced. On the other hand, when mixed with an epoxy resin with a high softening point or in semi-solid or solid form, the tackiness of the adhesive layer surface can be reduced. Moreover, an epoxy resin in liquid form can be used for the purpose of pre-dispersing components such as a thermally expandable microcapsule in powder or granular form contained in the thermosensitive foaming agent, or for the purpose of uniformly mixing the epoxy resin components.

Specific examples of such an epoxy resin that can be mixed include bisphenol type epoxy resins such as a bisphenol A type, a dimer acid-modified bisphenol A type, and a bisphenol F type; epoxy resins having an aliphatic skeleton such as hexane diol diglycidyl ether; phenoxy resins (polyhydroxy polyether synthesized from bisphenols and epichlorohydrin); and crystalline epoxy resins. While the crystalline epoxy resin is a solid that exhibits no tack at normal temperature, it acts as a reactive diluent at or above the melting point since the melt viscosity is significantly decreased at or above the melting point. For this reason, when the crystalline epoxy resin is contained in the adhesive layer (A1L), the fluidity of the adhesive layer (A1L) at the time of heating can be further enhanced, which is advantageous for the thermal expansion of the adhesive layer (A1L). In addition, since it is a solid that exhibits no tack at room temperature, it is useful to reduce the tackiness of the adhesive layer (A1L) surface, or to make the adhesive layer (A1L) surface non-tacky. In a case where the adhesive layer (A1L) is formed by the melt coating method, the melt viscosity of the epoxy resin can also be decreased to increase the speed of melt coating, by heating it at or above the melting point of the crystalline epoxy resin.

The number average molecular weight of the epoxy resin is generally 100 to 60000 in terms of standard polystyrene by GPC. The epoxy equivalent of the epoxy resin is generally 50 to 30000 g/eq.

The curing agent for the epoxy resin used in the adhesive layer (A1L) is not particularly limited, but a phenolic resin is preferred. When a phenolic resin is used as the curing agent in combination with an imidazole-based compound as the curing accelerator, which will be mentioned later, the curing time can be shortened and the heat resistance can be improved. In addition, by using a phenolic resin as the curing agent, it becomes easy to design for heat resistance, electrical characteristics, and other properties. The amount of the phenolic resin added is determined such that, theoretically, the hydroxy group equivalent number of the phenolic resin with respect to the epoxy equivalent number of the epoxy resin is around 1:1. The ratio of the hydroxy group equivalent number of the phenolic resin to the epoxy equivalent number of the epoxy resin is normally 0.5 to 2.0, and preferably 0.8 to 1.2.

The curing accelerator for the epoxy resin used in the adhesive layer (A1L) is not particularly limited, but an imidazole-based compound is preferred in a case where a phenolic resin is used as the curing agent. When an imidazole-based compound is used as the curing accelerator in combination with a phenolic resin as the curing agent, the curing time can be shortened and the heat resistance can be improved. In addition, compared to other curing accelerators, the imidazole-based compound has the advantage that it can be used as a stand-alone catalyst and is available in very fine particle size grades, making it easy to use.

Specific examples of the imidazole-based compound include imidazole derivatives such as 2-phenyl-4,5-dihydroxymethyl imidazole, 2-phenyl-4-methylimidazole, 2-ethyl-4-methylimidazole, 2,4-diethylimidazole, and 2-phenyl-4-methyl-5-hydroxyimidazole. Two or more imidazole-based compounds may be used in combination. In particular, 2-phenyl-4,5-dihydroxymethylimidazole is preferred. The content of the imidazole-based compound is preferably 0.1 to 1.0 parts by mass and more preferably 0.3 to 0.8 parts by mass with respect to 100 parts by mass of resin components in the adhesive layer.

It is preferable that the adhesive layer (A1L) contains a thermosensitive foaming agent. Examples of the thermosensitive foaming agent include inorganic foaming agents such as ammonium carbonate, ammonium hydrogen carbonate, ammonium nitrite, ammonium borohydride, and azides; organic foaming agents such as alkane fluorides such as trichloromonofluoromethane, azo-based compounds such as azobisisobutyronitrile, hydrazine-based compounds such as p-toluenesulfonyl hydrazide, semicarbazide-based compounds such as p-toluenesulfonyl semicarbazide, triazole-based compounds such as 5-morpholyl-1,2,3,4-thiatriazole, and N-nitroso compounds such as N,N-dinitrosoterephthalamide; thermally expandable microcapsules obtained by microcapsulating a thermal expansion agent composed of a hydrocarbon-based compound. Two or more thermosensitive foaming agents may be used in combination. In a case where an epoxy resin is used, the thermally expandable microcapsule is preferred from the standpoint that it does not inhibit the curing of the epoxy resin and has less adverse effect on the physical properties of the epoxy resin.

The thermally expandable microcapsule is a microcapsule whose shell is made of a thermoplastic resin having a gas barrier property, enclosing a thermal expansion agent inside the shell. When the thermally expandable microcapsule is heated, the thermoplastic resin as the shell is softened and the volume of the thermal expansion agent is increased, thereby expanding the capsule. For example, vaporization of a hydrocarbon-based compound having a low boiling point can be utilized for expansion of the capsule.

The expansion (foaming) temperature of the thermally expandable microcapsule is preferably at or above the softening point of the epoxy resin and at or below the activation temperature of the curing reaction of the epoxy resin. If this foaming temperature is at or above the softening point of the epoxy resin, the thermal expansion agent can be expanded sufficiently in the softened epoxy resin and the thickness of the adhesive layer (A1l) after foaming can be made uniform. In addition, if this foaming temperature is at or below the activation temperature of the curing reaction of the epoxy resin, curing of the epoxy resin before foaming can be prevented. Furthermore, in a case where melt or solution coating is included in the production process of the adhesive sheet, gelling of the epoxy resin during these coating steps and an accompanying drying step can be prevented, by setting the softening point of the epoxy resin at or below the activation temperature of the curing reaction.

The softening point of the epoxy resin can be measured using the ring and ball softening point test method prescribed in JIS K 2207. The foaming temperature of the thermally expandable microcapsule is a temperature at which volume variation of the thermally expandable microcapsule occurs, and it can be selected, for example, from the range of 70° C. or higher and 200° C. or lower, preferably 100° C. or higher and 180° C. or lower.

The content and the volume expansion rate of the thermosensitive foaming agent can be determined as appropriate, depending on the strength and adhesive force required for the cured adhesive layer (A1L), the expansion rate required for the adhesive sheet, and other factors. The content of the thermosensitive foaming agent is preferably 0.5 to 20 parts by mass and more preferably 2 to 15 parts by mass with respect to 100 parts by mass of resin components in the adhesive layer (A1L). The increase factor of the thickness of the adhesive sheet after foaming can be, for example, 1.1 times or more and 10 times or less.

The particle size of the thermosensitive foaming agent may be selected as appropriate depending on the thickness of the adhesive layer (A1L), and specifically, the average particle size may be about 5 to 20 μm.

It is preferable that other resins (such as a heat resistant resin) are added to the adhesive layer (A1L) from the standpoint of close adhesion to the substrate, flexibility when bending the adhesive sheet, a leveling property at the time of coating of the adhesive, and prevention of liquid drip upon heat curing, for example. Specific examples of the other resins include polyester resin, butyral resin, urethane resin, carboxyl group-terminated butadiene nitrile rubber (CTBN), and epoxy-modified butadiene. In particular, a urethane resin is most preferred from the standpoint of flexibility and adhesiveness.

The urethane resin is, in general, a resin containing a soft segment composed of a polyol monomer unit and a hard segment composed of a polyfunctional isocyanate compound or a low molecular glycol monomer unit. The polyol used in the urethane resin is a compound having two or more hydroxy groups. The number of hydroxy groups in the polyol is preferably 2 to 3 and more preferably 2 from the standpoint of enhancing characteristics such as rubber elasticity elongation recovery rate. As the polyol, for example, polyester polyol, polyether polyol, polycaprolactone polyol, polycarbonate polyol, and castor oil-based polyol can be used. Two or more polyols may be used in combination.

As the polyfunctional isocyanate compound used as the crosslinking agent for crosslinking the polyol, for example, polyfunctional aliphatic isocyanate compounds, polyfunctional alicyclic isocyanate compounds, and polyfunctional aromatic isocyanate compounds can be used. Also, trimethylolpropane adducts, water-reacted biuret products, and trimers having an isocyanurate ring of these compounds can be used. Two or more polyfunctional isocyanate compounds may be used in combination.

Specific examples of the polyfunctional aliphatic isocyanate compound include trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate, and 2,4,4-trimethylhexamethylene diisocyanate.

Specific examples of the polyfunctional alicyclic isocyanate compound include 1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate, and hydrogenated tetramethylxylylene diisocyanate.

Specific examples of the polyfunctional aromatic isocyanate compound include phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate, and xylylene diisocyanate.

The urethane resin is obtained by curing a composition containing the polyol and the polyfunctional isocyanate compound described above. In particular, from the standpoint of characteristics such as rubber elasticity elongation recovery rate, low crystallinity linear polyester-based polyurethane resins are preferred, and hexanediol copolyester-based polyurethane resins and polytetramethylene glycol-based polyurethane resins are more preferred.

The content of the urethane resin is preferably 10 to 60 parts by mass with respect to 100 parts by mass of resin components in the adhesive layer (A1L).

It is preferable that the adhesive layer (A1L) contains a filler from the standpoint of heat resistance, thermal conductivity, and reinforcement. The kind of the filler is not particularly limited, but examples thereof include inorganic fillers such as aluminum oxide, magnesium oxide, calcium oxide, aluminum hydroxide, magnesium hydroxide, boron nitride, silicon nitride, silicon oxide, and talc (magnesium silicate), and fibrous fillers such as milled fiber and chopped fiber. Two or more fillers may be used in combination. The content of the filler is preferably 5 to 300 parts by mass and more preferably 10 to 100 parts by mass with respect to 100 parts by mass of thermosetting resin components in the adhesive.

The adhesive layer (A1L) may contain additives such as antioxidants such as phenol-based antioxidants and sulfur-based antioxidants, silane coupling agents such as epoxy-modified alkoxysilanes, thixotropic agents such as fumed silica, and pigments and dyes for identification, if necessary.

The thickness of the adhesive layer (A1L) may be determined as appropriate depending on the intended applications. It is normally 2 to 300 μm, preferably 2 to 150 μm.

[Tackiness Agent Region (A2R)]

The tackiness agent region (A2R) in the present invention is provided for temporary fixation before the adhesive is heat cured for final adhesion.

As the tackiness agent (A2) constituting the tackiness agent region (A2R) in the present invention, acrylic tackiness agents, rubber-based tackiness agents, and silicone-based tackiness agents can be used, for example. Two or more of these may be mixed for use.

The type of the acrylic tackiness agent is not particularly limited, and a variety of known acrylic tackiness agents composed mainly of acrylic copolymers can be used. As the acrylic copolymer, for example, acrylic copolymers obtained by copolymerizing a (meth)acrylic acid ester, a carboxyl group-containing monomer, and other monomers, if necessary, can be used. Specific examples of the (meth)acrylic acid ester include methyl (meth)acrylate, ethyl (meth)acrylate, n-propyl (meth)acrylate, isopropyl (meth)acrylate, n-butyl (meth)acrylate, isobutyl (meth)acrylate, 2-ethylhexyl (meth)acrylate, octyl (meth)acrylate, isooctyl (meth)acrylate, nonyl (meth)acrylate, isononyl (meth)acrylate, and lauryl (meth)acrylate. Specific examples of the carboxyl group-containing monomer include (meth)acrylic acid, itaconic acid, crotonic acid, (anhydrous) maleic acid, fumaric acid, 2-carboxy-1-butene, 2-carboxy-1-pentene, 2-carboxy-1-hexene, and 2-carboxy-1-heptene. Specific examples of the other monomers include hydroxy group-containing monomers such as 2-hydroxyethyl (meth)acrylate, 3-hydroxypropyl (meth)acrylate, and 4-hydroxybutyl (meth)acrylate, acrylonitrile, styrene, 2-methylolethyl acrylamide, vinyl acetate, and acryloyl morpholine.

As the acrylic copolymer, preferred is an acrylic copolymer containing, as the constitutional components of the polymer chain, a (meth)acrylic acid alkyl ester having an alkyl group having 1 to 3 carbon atoms (a1), a (meth)acrylic acid alkyl ester having an alkyl group having 4 to 12 carbon atoms (a2), a carboxyl group-containing monomer (a3), a hydroxy group-containing monomer (a4), and vinyl acetate (a5).

Specific examples of the (meth)acrylic acid alkyl ester having an alkyl group having 1 to 3 carbon atoms (a1) include methyl (meth)acrylate, ethyl (meth)acrylate, and propyl (meth)acrylate. In particular, methyl (meth)acrylate is preferred. The content of the (meth)acrylic acid alkyl ester (A1) is 10 to 20% by mass, preferably 12 to 16% by mass, in 100% by mass of the constitutional components (monomer units) of the acrylic copolymer.

Specific examples of the (meth)acrylic acid alkyl ester having an alkyl group having 4 to 12 carbon atoms (a2) include butyl (meth)acrylate, isobutyl (meth)acrylate, 2-ethylhexyl (meth)acrylate, octyl (meth)acrylate, isooctyl (meth)acrylate, isononyl (meth)acrylate, and lauryl (meth)acrylate. In particular, 2-ethylhexyl (meth)acrylate is preferred. The content of the (meth)acrylic acid alkyl ester (a2) is 50 to 80% by mass, preferably 65 to 79% by mass, in 100% by mass of the constitutional components (monomer units) of the acrylic copolymer.

Specific examples of the carboxyl group-containing monomer (a3) include acrylic acid, methacrylic acid, itaconic acid, crotonic acid, maleic acid, fumaric acid, 2-carboxy-1-butene, 2-carboxy-1-pentene, 2-carboxy-1-hexene, and 2-carboxy-1-heptene. The content of the carboxyl group-containing monomer (a3) is 10 to 15% by mass, preferably 10 to 12% by mass, in 100% by mass of the constitutional components (monomer units) of the acrylic copolymer.

Specific examples of the hydroxy group-containing monomer (a4) include 2-hydroxyethyl (meth)acrylate, 3-hydroxypropyl (meth)acrylate, and 4-hydroxybutyl (meth)acrylate. The content of the hydroxy group-containing monomer (a4) is 0.01 to 0.5% by mass, preferably 0.05 to 0.15% by mass, in 100% by mass of the constitutional components (monomer units) of the acrylic copolymer.

The content of vinyl acetate (a5) is 1 to 5% by mass, preferably 2 to 4% by mass, in 100% by mass of the constitutional components (monomer units) of the acrylic copolymer.

The acrylic copolymer can be obtained by copolymerizing at least the components (a1) to (a5) as described above. The polymerization method is not particularly limited, but radical solution polymerization is preferred from the standpoint of ease of polymer design. Alternatively, an acrylic syrup composed of an acrylic copolymer and its monomer may be prepared first, and then polymerized by blending this acrylic syrup with a crosslinking agent and an additional photopolymerization initiator.

In production of the acrylic copolymer, monomers other than the components (a1) to (a5) may be copolymerized to the extent that the effects of the present invention are not impaired.

For the acrylic tackiness agent, it is general to use a crosslinking agent that has reactivity with functional groups of the acrylic copolymer. As the crosslinking agent, isocyanate compounds, acid anhydrides, amine compounds, epoxy compounds, metal chelates, aziridine compounds, and melamine compounds can be used, for example. The amount of the crosslinking agent added is normally 0.01 to 5 parts by mass, preferably 0.02 to 1 part by mass, and more preferably 0.3 to 0.6 parts by mass with respect to 100 parts by mass of the acrylic copolymer. In addition, from the standpoint of ensuring the tackiness force necessary for temporary fixation, the peak temperature of tan δ of the acrylic tackiness agent used in the tackiness agent region (A2R) is preferably 20° C. or lower and more preferably −50° C. to 10° C.

To the acrylic tackiness agent, if necessary, silane coupling agents; tackifier resins such as rosin-based, terpene-based, petroleum-based, coumarone-indene-based, pure monomer-based, phenol-based, and xylene-based; softening agents including mineral oils such as paraffin-based process oil, polyester-based plasticizers, vegetable oils, and others; and anti-aging agents such as aromatic secondary amine-based, monophenol-based, bisphenol-based, polyphenol-based, benzimidazole-based, and phosphorous acid-based may be added. Saturated hydrocarbon resins may also be blended.

The type of the rubber-based tackiness agent is not particularly limited, and a variety of known rubber-based tackiness agents composed mainly of rubber components can be used. Specific examples of the rubber component include synthetic rubbers such as butyl rubber, polyisobutylene rubber, isoprene rubber, styrene-isobutylene-styrene block copolymer, styrene-isoprene block copolymer, styrene-butadiene rubber, styrene-isoprene-styrene block copolymer, styrene-butadiene-styrene block copolymer, styrene-ethylene-butylene-styrene block copolymer, styrene-ethylene-propylene-styrene block copolymer, and styrene-ethylene-propylene block copolymer; and natural rubbers. Two or more rubber components may be used in combination. The butyl rubber is a rubber generally composed mainly of a copolymer of isobutylene and 1 to 3% by mass of isoprene.

In a case where the rubber-based tackiness agent is used in the tackiness agent region (A2R), it is preferable that the tackiness agent composition constituting the tackiness agent region (A2R) contains a saturated hydrocarbon resin together with the rubber-based tackiness agent. The saturated hydrocarbon resin is a hydrocarbon resin that has no unsaturated bonds and is a component for improving the tackiness of the tackiness agent region (A2R).

The type of the saturated hydrocarbon resin is not particularly limited, and for example, a variety of alicyclic or aliphatic saturated hydrocarbon resins known as tackifiers can be used. Two or more saturated hydrocarbon resins may be used in combination. In particular, alicyclic saturated hydrocarbon resins are preferred, and hydrocarbon resins that have been subjected to hydrogenation treatment to eliminate unsaturated bonds are more preferred. Hydrogenated petroleum resins are commercially available products of the saturated hydrocarbon resin. The hydrogenated petroleum resin is a resin obtained by subjecting a petroleum resin (such as aromatic petroleum resin, aliphatic petroleum resin, and copolymerized petroleum resin of an alicyclic component and an aromatic component) to hydrogenation treatment. In particular, hydrogenated petroleum resins obtained by subjecting aromatic petroleum resins to hydrogenation treatment (alicyclic saturated hydrocarbon resins) are preferred. The preferred hydrogenated petroleum resin is available as a commercial product (for example, Arkon® P-100, manufactured by Arakawa Chemical Industries, Ltd.). The content of the saturated hydrocarbon resin is preferably 0.01 to 100 parts by mass and more preferably 0.01 to 80 parts by mass with respect to 100 parts by mass of the tackiness agent components. A higher content of the saturated hydrocarbon resin results in more improved tackiness. In addition, in order to ensure the tackiness force necessary for temporary fixation, the peak temperature of tan δ of the rubber-based tackiness agent used in the tackiness agent region (A2R) is preferably −10° C. or lower and more preferably −20° C. to 10° C.

The type of the silicone-based tackiness agent is not particularly limited, and a variety of known silicone-based tackiness agents composed mainly of silicone components can be used. Examples of the silicone component include silicone rubbers and silicone resins, composed mainly of organopolysiloxane. To such a silicone component, a catalyst such as a platinum catalyst and a crosslinking agent such as a siloxane-based crosslinking agent or a peroxide-based crosslinking agent may be added to perform crosslinking and polymerization. The saturated hydrocarbon resin previously mentioned may also be blended. In addition, in order to ensure the tackiness force necessary for temporary fixation, the peak temperature of tan δ of the silicone-based tackiness agent used in the tackiness agent region (A2R) is preferably 70° C. or lower and more preferably 50° C. or lower.

Each of the tackiness agents described above may further contain other components if necessary. Specific examples thereof include solvents such as toluene; additives such as antioxidants, ultraviolet absorbers, light stabilizers, and antistatic agents; and fillers or pigments such as carbon black, calcium oxide, magnesium oxide, silica, zinc oxide, and titanium oxide.

[Substrate]

Although the substrate in the present invention is not particularly limited, it is preferably a heat resistant insulating substrate. The level of heat resistance depends on the applications where it is used, but for example, the melting temperature of the substrate is preferably 200° C. or higher and more preferably 250° C. or higher. Also, for example, the continuous operating temperature of the substrate, as measured in accordance with UL-746B, is preferably 100° C. or higher and more preferably 150° C. or higher.

The substrate may be a single-layer substrate composed of a single member, or a substrate composed of a laminate having a laminated structure in which one member is affixed to another member by means of an adhesive for affixation. The substrate may have flexibility or resilience, and its properties are selected as appropriate depending on the applications.

Although the member constituting the substrate is not particularly limited, it is preferably a resin film, non-woven fabric, or paper, and more preferably a resin film. In a case where the substrate is a substrate composed of a laminate, the member is preferably one or more members selected from the group consisting of resin films, non-woven fabrics, and paper, and it is more preferable that at least one of the members is a resin film.

Specific examples of the resin film include polyester-based resins such as polyethylene terephthalate (PET), polybutylene terephthalate, polyethylene naphthalate (PEN), and aromatic polyester; polycarbonate; polyarylate; polyurethane; polyamide-based resins such as polyamide and polyetheramide; polyimide-based resins such as polyimide, polyetherimide, and polyamideimide; polysulfone-based resins such as polysulfone and polyethersulfone; polyetherketone-based resins such as polyetherketone and polyether ether ketone; polyphenylene sulfide (PPS); and modified polyphenylene oxide. Two or more resin films may be used in combination. In particular, polyphenylene sulfide (PPS), polyethylene naphthalate (PEN), polyimide, and polyether ether ketone are preferred.

The substrate may be subjected to corona treatment or primer treatment in order to improve close adhesion to the adhesive layer (A1L).

The thickness of the substrate may be selected as appropriate depending on the intended applications. It is generally 2 to 200 μm, preferably 9 to 100 μm, and more preferably 12 to 100 μm.

[Releasing Layer]

The adhesive sheet of the present invention may have a releasing layer. Specific examples of the releasing agent include organic hot melt resins such as silicone, paraffin, and long chain alkyl-based compounds, siliconeless and silicone-modified aminoalkyd-based thermosetting resins, and inorganic fine particles such as calcium carbonate and silicon oxide fine particles. In particular, from the standpoint of storage stability and adhesiveness of the adhesive sheet, long chain alkyl-based compounds and alkyd-based thermosetting resins are preferred. Organic or inorganic oils are not preferred since they pollute the production line and the use line of the adhesive sheet and significantly decrease adhesiveness of the adhesive sheet (A1L).

As the long chain alkyl-based compound, commercially available long chain alkyl-based releasing agents can be used. For example, mention may be made of "Peeloil® 1010" (manufactured by Lion Specialty Chemicals Co., Ltd.), which is an organic solvent soluble long chain alkyl-based releasing agent, and "NC003" (manufactured by Chukyo Yushi Co., Ltd.), which is a water-dispersible long chain alkyl-based releasing agent. In order to coat the surface of a layer having relatively low polarity, such as an epoxy-based adhesive layer, with a thin film of the water-dispersible long chain alkyl-based compound, it is preferable to use an appropriate wettability improver. Specific examples of the wettability improver include acetylenediol.

As the alkyd-based compound, mention may be made of commercially available "Tesfine® 303", "Tesfine 305", "Tesfine 314", "Tesfine 319" (manufactured by Showa Denko Materials Co., Ltd.), and others.

The long chain alkyl-based releasing agent may be diluted with a solvent to an appropriate concentration and applied such that the thickness of the releasing layer after drying is preferably 0.02 to 0.2 μm. The alkyd resin-based releasing agent may be diluted with a solvent to an appropriate concentration and applied such that the thickness of the releasing layer after drying is preferably 0.02 to 2 μm.

[Adhesive Sheet]

The adhesive sheet of the present invention is an adhesive sheet having the tackiness agent region (A2R) described above, and more specifically, it is an adhesive sheet, wherein at least one surface of the adhesive layer (A1L) has the tackiness agent region (A2R) formed by partially providing the tackiness agent (A2), and the region where the tackiness agent region (A2R) is not formed on the surface is the adhesive-layer-exposed region (A1LR). The adhesive sheet of the present invention may be a baseless type adhesive sheet that does not have a substrate, may be a single-surface adhesive sheet, or may be a double-surfaces adhesive sheet.

On top of the outermost layer of the adhesive sheet of the present invention, for example, on top of the adhesive layer (A1L), tackiness agent region (A2R), or releasing layer, a release film may be provided.

The release film is not particularly limited, but examples thereof include those obtained by treating fine paper, kraft paper, glassine paper, polyester film, polyolefin film, and others with a releasing agent, those obtained by laminating fine paper, kraft paper, glassine paper, and others with polyethylene or other materials and then treating them with a releasing agent, and untreated polyolefin films and polyether ether ketone films.

The adhesive sheet of the present invention has a thickness before heat curing of, for example, 10 to 1000 μm. In a case where the adhesive sheet of the present invention is used for adhesion in narrow gaps, the thickness before heat curing is preferably 250 μm or less, and more preferably 20 to 200 μm.

The method for producing the adhesive sheet of the present invention is not particularly limited. For example, a baseless type adhesive sheet as shown in FIG. 1(a) can be produced by forming the adhesive layer (A1L) on the surface of a separator, followed by affixing the tackiness agent region (A2R) on one surface of the adhesive layer (A1L). An adhesive sheet having a releasing layer as shown in FIG. 1(d) can be produced by forming the adhesive layer (A1L) on the surface of a separator, performing releasing treatment on one surface to form the releasing layer, then peeling off the separator, and affixing the tackiness agent region (A2R) on the surface. A double-surfaces adhesive sheet as shown in FIG. 1(e) and others can be produced by forming the adhesive layers (A1L) on the surface of separators, affixing them to both surfaces of the substrate, peeling off the separator of the adhesive layer (A1L) on one surface, and affixing the tackiness agent region (A2R) to the surface. A double-surfaces adhesive sheet having a releasing layer as shown in FIG. 1(h) can be produced by peeling off the separator of the adhesive layer (A1L) on another surface and performing releasing treatment to form the releasing layer. A double-surfaces adhesive sheet having the tackiness agent regions (A2R) on both surfaces as shown in FIG. 1(i) can be produced by peeling off the separators of the adhesive layers (A1L) on both surfaces and affixing the tackiness agent regions (A2R). However, methods other than these are also possible.

Figure 2:
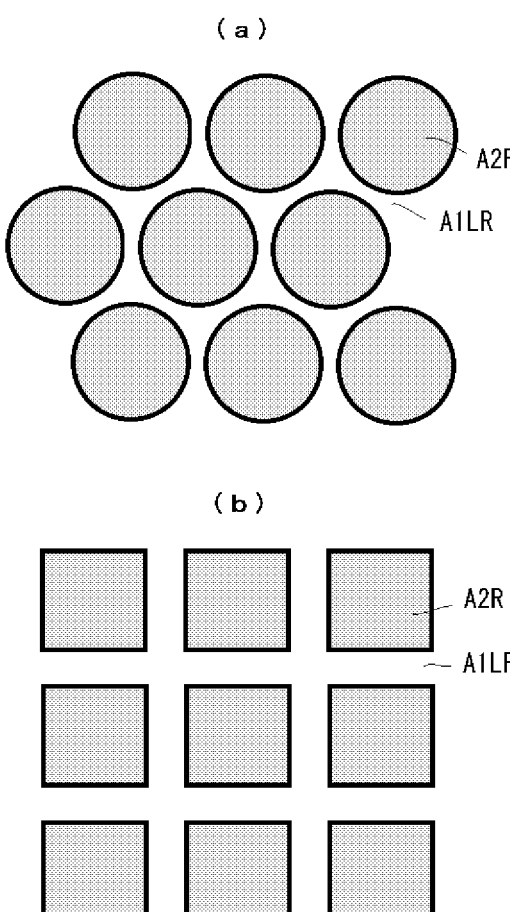
FIG. 2 is a schematic plan view showing embodiments of the adhesive sheet of the present invention.

The tackiness agent region (A2R) can be formed by, for example, applying the desired pattern as shown in FIG. 2 on a separator by gravure printing, and then curing and drying. An adhesive sheet in which the outer surface of the tackiness agent region (A2R) and the outer surface of the adhesive-layer-exposed region (A1LR) are present in substantially the same plane as shown in FIG. 1(b) and FIG. 1(f) can be produced by heat laminating and affixing the tackiness agent region (A2R) to the adhesive layer (A1L).

The adhesive layer (A1L) can be formed by conventionally known methods such as solution coating method, melt coating method, melt extrusion method, and rolling method. The melt coating method is preferred from the standpoint of productivity and economic efficiency since it can be conducted without solvent and does not require a solvent removal step or processing equipment. In a case where the melt coating method is used, it is preferable that the epoxy resin contains a crystalline epoxy resin. In this case, by heating it at or above the melting point of the crystalline

16

[Curing Accelerator]

"S1": 2-phenyl-4,5-dihydroxymethylimidazole (manufactured by SHIKOKU CHEMICALS CORPORATION, trade name 2PHZ-PW)

"S2": 2,4-diamino-6-[2'-methylimidazole-(1')]-ethyl-s-triazine isocyanuric acid adduct (manufactured by SHIKOKU CHEMICALS CORPORATION, trade name 2MAOK-PW)

[Solvent]

"MEK": methyl ethyl ketone

TABLE 1

| | | Formulation 1 | Formulation 2 | Formulation 3 | Formulation 4 | Formulation 5 | Formulation 6 |
|---|---|---|---|---|---|---|---|
| Epoxy resin | E1 | 100 | 100 | — | — | — | — |
| | E2 | — | — | 100 | 80 | — | — |
| | E3 | — | — | — | 20 | — | — |
| | E4 | — | — | — | — | 100 | 100 |
| Curing agent | C1 | 45 | 45 | 55 | 50 | 81 | — |
| | C2 | — | — | — | — | — | 8.8 |
| Elastomer | ER | 32 | 32 | 43 | 33 | 50 | 24 |
| Filler | F | 31 | 31 | 33 | 32 | 39 | 23 |
| Foaming agent | H | 10.1 | — | 10.4 | 10.1 | 12.1 | 7.3 |
| Curing accelerator | S1 | 0.4 | 0.4 | 0.4 | 0.4 | 0.4 | — |
| | S2 | — | — | — | — | — | 0.4 |
| Solvent | MEK | 178 | 170 | 198 | 185 | 231 | 109 | epoxy resin, the melt viscosity of the epoxy resin can be decreased and the speed of melt coating can be increased.

EXAMPLES

Hereinafter, the present invention will be described in further detail with reference to Examples. However, the present invention is not limited to them. In the following description, "parts" means parts by mass.

<Adhesive (A1)>

Each of the following components was mixed in the amounts (parts) shown in Table 1 to obtain adhesives.

[Epoxy Resin]

"E1": phenol novolac type epoxy resin (softening point 92° C., epoxy equivalent 218 g/eq)

"E2": phenol novolac type epoxy resin (semi-solid, epoxy equivalent 180 g/eq)

"E3": polypropylene glycol diglycidyl ether type epoxy resin (liquid form, epoxy equivalent 315 g/eq)

"E4": polyglycidylamine type epoxy resin (liquid form, epoxy equivalent 112 g/eq)

[Curing Agent]

"C1": triphenylmethane type phenolic resin (softening point 110° C., hydroxy group equivalent 97 g/eq)

"C2": dicyandiamide (manufactured by Mitsubishi Chemical Corporation, trade name DICY7)

[Elastomer]

"ER": linear polyester polyurethane resin (softening point 87° C., molecular weight 222300, hydroxy group content 0.1%)

[Filler]

"F": magnesium silicate (average particle size 5 μm)

[Foaming Agent]

"H": thermally expandable microcapsule (average particle size 15 μm, expansion initiation temperature 125 to 135° C., maximum expansion temperature 150 to 160° C.)

<Tackiness Agent (A2)>

(Preparation of Acrylic Copolymer)

In a reaction apparatus equipped with a stirrer, a thermometer, a reflux condenser, and a nitrogen gas introduction tube, 13% by mass of methyl acrylate, 70% by mass of 2-ethylhexyl acrylate, 4.9% by mass of n-butyl acrylate, 10% by mass of acrylic acid, 0.1% by mass of 4-hydroxybutyl acrylate, 2% by mass of vinyl acetate, and 0.1 parts of ethyl acetate, n-dodecanethiol as a chain transfer agent, and lauryl peroxide as a peroxide-based radical polymerization initiator were charged. Nitrogen gas was sealed in the reaction apparatus, and the polymerization reaction was carried out under a stream of nitrogen gas with stirring at 68° C. for 3 hours, followed by 78° C. for 3 hours. Thereafter, the reaction apparatus was cooled to room temperature, and ethyl acetate was added. This resulted in an acrylic copolymer with a solid concentration of 30%. The weight average molecular weight (Mw) of the acrylic copolymer was 1 million and the theoretical Tg was −62° C.

The weight average molecular weight (Mw) of the acrylic copolymer is the value obtained by measuring the molecular weight of the acrylic copolymer in terms of standard polystyrene by the GPC method, using the following measurement apparatus and conditions.

Apparatus: LC-2000 series (manufactured by JASCO Corporation)

Columns: Shodex KF-806M×2, Shodex KF-802×1

Eluent: tetrahydrofuran (THF)

Flow rate: 1.0 mL/min

Column temperature: 40° C.

Injection volume: 100 μL

Detector: refractometer (RI)

Measurement sample: the sample obtained by dissolving the acrylic polymer in THF to fabricate a solution with a concentration of the acrylic polymer of 0.5% by mass, and filtering it through a filter to remove debris.

The theoretical Tg of the acrylic copolymer is the value calculated according to the FOX formula.

(Preparation of Acrylic Tackiness Agent Composition)

To 100 parts of the solid content of the acrylic copolymer, 0.48 parts of an isocyanate-based crosslinking agent (manufactured by Tosoh Corporation, trade name Coronate® L-45E), 0.15 parts of a silane coupling agent (manufactured by Shin-Etsu Chemical Co., Ltd., trade name KBM-403), and 0.07 parts of an antioxidant (manufactured by BASF SE, trade name Irganox® 1010) were added, and the mixture was mixed to prepare an acrylic tackiness agent composition (tackiness agent (A2)). The peak temperature of tan δ of this acrylic tackiness agent composition was 2° C.

<Formation of Tackiness Agent Region (A2R)>

(FIG. 2(a) Type)

The acrylic tackiness agent composition obtained as described above was applied by gravure printing onto a PET film that had been subjected to releasing treatment (releasing film) in a pattern of regularly arranged round island-shaped tackiness agent regions (A2R) in horizontal rows at half-displaced positions as shown in FIG. 2(a), and cured and dried to form tackiness agent regions (A2R) with a thickness of 1 μm. This resulted in a sheet for forming the FIG. 2(a) type tackiness agent regions (A2R).

The diameter of these round island-shaped tackiness agent regions (A2R) was 1.0 mm, and the width of the adhesive-layer-exposed region (A1LR) was 0.25 mm. The proportion of the area of the tackiness agent regions (A2R) to the total area (100%) of the area of the tackiness agent regions (A2R) and the area of the adhesive-layer-exposed region (A1LR) was 58%.

(FIG. 2(b) Type)

The acrylic tackiness agent composition obtained as described above was applied by gravure printing onto a PET film that had been subjected to releasing treatment in a pattern of regularly arranged rectangular island-shaped tackiness agent regions (A2R) in vertical rows at equal intervals as shown in FIG. 2(b), and cured and dried to form tackiness agent regions (A2R) with a thickness of 2 μm. This resulted in a sheet for forming the FIG. 2(b) type tackiness agent regions (A2R).

These rectangular island-shaped tackiness agent regions (A2R) were 1.2 mm squares, and the width of the adhesive-layer-exposed region (A1LR) was 0.3 mm. In this case, the proportion of the area of the tackiness agent regions (A2R) to the total area (100%) of the area of the tackiness agent regions (A2R) and the area of the adhesive-layer-exposed region (A1LR) was 64%.

Example 1

To a PET film that had been subjected to silicone treatment (releasing film), a solution of the adhesive (A1) (formulation 1) was applied such that the adhesive thickness after drying was 60 μm, and dried to obtain a sheet for forming the adhesive layer (A1L).

As the substrate, a PPS film (manufactured by Toray Industries, Inc.) with a thickness of 25 μm was prepared. On each of both surfaces of this substrate, a side of the adhesive layer (A1L) of the sheet for forming the adhesive layer (A1L), obtained as described above, was laminated. This resulted in formation of the adhesive layers (A1L) with a thickness of 60 μm on both surfaces of the substrate.

Next, the PET film (releasing film) on one surface was peeled off, and a side of the tackiness agent region (A2R) of the sheet for forming the FIG. 2(a) type tackiness agent regions (A2R), fabricated as previously described, was laminated. This resulted in formation of the FIG. 2(a) type tackiness agent regions (A2R) on the outer surface of one adhesive layer (A1L). The configuration of the adhesive sheet obtained in the present Example corresponds to the configuration shown in FIG. 1(a).

Example 2

Except that the width of the adhesive-layer-exposed region (A1LR) was widened to change the proportion of the area of the tackiness agent regions (A2R) to the total area (100%) of the area of the tackiness agent regions (A2R) and the area of the adhesive-layer-exposed region (A1LR) to 1%, an adhesive sheet was fabricated in the same manner as in Example 1.

Example 3

Except that the sheet for forming the FIG. 2(b) type tackiness agent regions (A2R) was used instead of the sheet for forming the FIG. 2(a) type tackiness agent regions (A2R), an adhesive sheet was fabricated in the same manner as in Example 1.

Example 4

Except that a solution of the adhesive (A1) of formulation 2 (a solution free from a foaming agent) was used instead of the solution of the adhesive (A1) of formulation 1, an adhesive sheet was fabricated in the same manner as in Example 1. The configuration of the adhesive sheet obtained in the present Example corresponds to the configuration shown in FIG. 1(g).

Example 5

Except that, of the two adhesive layers (A1L), the PET film (releasing film) on the adhesive layer (A1L) on which the tackiness agent regions (A2R) were not formed was peeled off and releasing treatment was performed to form the releasing layer, an adhesive sheet was fabricated in the same manner as in Example 1. The configuration of the adhesive sheet obtained in the present Example corresponds to the configuration shown in FIG. 1(h).

Specifically, this releasing layer was formed by applying a mixed solution of 5.71% by mass of Tesfine® 305 (manufactured by Showa Denko Materials Co., Ltd.), 0.14% by mass of Dryer 900 (manufactured by Showa Denko Materials Co., Ltd.), 75.35% by mass of isopropyl alcohol, and 18.8% by mass of toluene with Mayer Bar #5, and then drying it.

Example 6

Except that the tackiness agent regions (A2R) were formed on both of the two adhesive layers (AIL), an adhesive sheet was fabricated in the same manner as in Example 1. The configuration of the adhesive sheet obtained in the present Example corresponds to the configuration shown in FIG. 1(f).

Example 7

To a PET film that had been subjected to silicone treatment (releasing film), a solution of the adhesive (A1)

(formulation 1) was applied such that the adhesive thickness after drying was 60 μm, and dried to form the adhesive layer (A1L). On one side of this adhesive layer (A1L), a side of the tackiness agent region (A2R) of the sheet for forming the FIG. 2(a) type tackiness agent regions (A2R) was laminated in the same manner as in Example 1. This resulted in formation of the FIG. 2(a) type tackiness agent regions (A2R) on one surface of the adhesive layer (A1L). The configuration of the adhesive sheet obtained in the present Example corresponds to the configuration shown in FIG. 1(a) (baseless type having no substrate).

Example 8

Except that a solution of the adhesive (A1) of formulation 3 was used instead of the solution of the adhesive (A1) of formulation 1, an adhesive sheet was fabricated in the same manner as in Example 1.

Example 9

Except that a solution of the adhesive (A1) of formulation 4 was used instead of the solution of the adhesive (A1) of formulation 1, an adhesive sheet was fabricated in the same manner as in Example 1.

Example 10

Except that, when laminating the sheet for forming the FIG. 2(a) type tackiness agent regions (A2R), the sheet was laminated while heating it using a thermal laminating machine (set temperature 110° C.) such that the outer surface of the tackiness agent regions (A2R) and the outer surface of the adhesive-layer-exposed region (A1LR) were formed to be present in substantially the same plane, an adhesive sheet was fabricated in the same manner as in Example 1. The configuration of the adhesive sheet obtained in the present Example corresponds to the configuration shown in FIG. 1(b).

Comparative Example 1

Except that the sheet for forming the FIG. 2(a) type tackiness agent regions (A2R) was not used, and instead, the acrylic tackiness agent composition (tackiness agent (A2)) was entirely applied to the outer surface of one adhesive layer (A1L), an adhesive sheet was fabricated in the same manner as in Example 1.

Comparative Example 2

Except that the tackiness agent regions (A2R) were not formed, an adhesive sheet was fabricated in the same manner as in Example 1.

Comparative Example 3

Except that a solution of the adhesive (A1) of formulation 5 was used instead of the solution of the adhesive (A1) of formulation 1, an adhesive sheet was fabricated in the same manner as in Comparative Example 2.

Comparative Example 4

Except that a solution of the adhesive (A1) of formulation 6 was used instead of the solution of the adhesive (A1) of formulation 1, an adhesive sheet was fabricated in the same manner as in Comparative Example 2.

Comparative Example 5

Except that the sheet for forming the FIG. 2(a) type tackiness agent regions (A2R) was not used, and instead, the acrylic tackiness agent composition (tackiness agent (A2)) was entirely applied to the outer surface of two adhesive layers (A1L), an adhesive sheet was fabricated in the same manner as in Example 1.

For the above adhesive sheets of Examples 1 to 10 and Comparative Examples 1 to 5, evaluations were carried out in accordance with the following methods. The results are shown in Tables 2 to 4.

[Peak Temperature of Tan δ of Adhesive (A1)]

Using a viscoelasticity tester for dynamic viscoelasticity measurement, an adhesive sample with a thickness of about 2 mm was sandwiched between the parallel plates of the measurement section of the tester, and the storage modulus G' and the loss modulus G" were measured at a frequency of 10 Hz and at −20° C. to 100° C. The tan δ was determined according to the calculation formula of tan δ (loss factor) =G"/G', and the peak temperature was analyzed.

[Low-Temperature Sticking Property (Temporary Fixability)]

Under a 5° C. environment, a 20 mm square sheet was pressed onto a polished SUS plate with a 2 kg roller, and after 10 seconds, the SUS plate was lifted and turned over to perform evaluation based on the following criteria.

"PASS": The sheet did not fall off.

"FAIL": The sheet fell off.

[Adhesiveness Maintenance Rate (200° C.)]

The shear adhesive force at the time of heating at 200° C. was measured for each of the adhesive sheet with the tackiness agent regions (A2R) and the adhesive sheet without the tackiness agent regions (A2R), and if the strength in the case without the tackiness agent regions (A2R) was defined as 100%, the ratio of the strength in the case with the tackiness agent regions (A2R) was determined by the following expression: (Shear strength at the time of heating with tackiness agent regions (A2R)) (Shear strength at the time of heating without tackiness agent regions (A2R))×100.

Note that the method for measuring the shear adhesive force is as follows.

An adhesive sheet (10 mm square) was stuck onto a SPCC plate, spacers with a predetermined thickness were placed on either side of the adhesive sheet, another SPCC plate was piled on top of the spacers, the spacer sections were fastened with clips, and the sheet was heated in a hot air dryer at 170° C. for 20 minutes for curing. The fabricated test specimen was tensioned at a speed of 50 mm/min with a tensile tester equipped with a thermostatic bath set to 200° C. to measure the strength.

The spacer thickness was 300 μm for Examples 1 to 3, 5, 6, 8 to 10, and Comparative Examples 1 to 4, 100 μm for Example 7, and 0 μm for Example 4 and Comparative Example 5.

[Resin Flow Resistance]

A 10 mm square adhesive sheet was sandwiched between glass plates, a 500 g weight was placed on it, and the amount of resin sticking out was measured with a caliper after 1 hour at 40° C.

(Width of resin after test)−(Width of resin (width of sheet) before test)

[Life (Low-Temperature Sticking Property)]

After storing the adhesive sheet at 40° C. for 1 day, the "low-temperature sticking property" test was conducted to perform evaluation based on the following criteria.

"PASS": The sheet did not fall off.

"FAIL": The sheet fell off.

TABLE 2

|  |  | Example 1 | Example 2 | Example 3 | Example 4 | Example 5 |
|---|---|---|---|---|---|---|
| Adhesive layer (A1L) | Formulation | 1 | 1 | 1 | 2 | 1 |
|  | tan δ peak temperature | 46° C./48° C. | 46° C./48° C. | 46° C./48° C. | 46° C./48° C. | 46° C./48° C. |
|  | Foaming agent | Present | Present | Present | Absent | Present |
| Tackiness agent region (A2R) | Shape | FIG. 2 (a) | FIG. 2 (a) | FIG. 2 (b) | FIG. 2 (a) | FIG. 2 (a) |
|  | Area (%) | 58% | 1% | 64% | 58% | 58% |
|  | Location | Single surface | Single surface | Single surface | Single surface | Single surface |
| Releasing layer |  | Absent | Absent | Absent | Absent | Present |
| Substrate |  | Present | Present | Present | Present | Present |
| Configuration |  | FIG. 1 (e) | FIG. 1 (e) | FIG. 1 (e) | FIG. 1 (g) | FIG. 1 (h) |
| Evaluation results | Low-temperature sticking property | PASS | PASS | PASS | PASS | PASS |
|  | Adhesiveness maintenance rate (200° C.) | 94% | 95% | 102% | 109% | 97% |
|  | Resin flow resistance [mm] | 0 | 0 | 0 | 0 | 0 |
|  | Life | PASS | PASS | PASS | PASS | PASS |

TABLE 3

|  |  | Example 6 | Example 7 | Example 8 | Example 9 | Example 10 |
|---|---|---|---|---|---|---|
| Adhesive layer (A1L) | Formulation | 1 | 1 | 3 | 4 | 1 |
|  | tan δ peak temperature | 46° C./48° C. | 46° C./48° C. | 26° C./ | 18° C./ | 46° C./48° C. |
|  | Foaming agent | Present | Present | Present | Present | Present |
| Tackiness agent region (A2R) | Shape | FIG. 2 (a) | FIG. 2 (a) | FIG. 2 (a) | FIG. 2 (a) | FIG. 2 (a) |
|  | Area (%) | 58% | 58% | 58% | 58% | 58% |
|  | Location | Both surfaces | Single surface | Single surface | Single surface | Single surface |
| Releasing layer |  | Absent | Absent | Absent | Absent | Absent |
| Substrate |  | Present | Absent | Present | Present | Present |
| Configuration |  | FIG. 1 (f) | FIG. 1 (a) | FIG. 1 (a) | FIG. 1(a) | FIG. 1 (b) |
| Evaluation results | Low-temperature sticking property | PASS | PASS | PASS | PASS | PASS |
|  | Adhesiveness maintenance rate (200° C.) | 94% | 100% | 110% | 94% | 105% |
|  | Resin flow resistance [mm] | 0 | 0 | 0 | 0 | 0 |
|  | Life | PASS | PASS | PASS | PASS | PASS |

TABLE 4

|  |  | Comparative Example 1 | Comparative Example 2 | Comparative Example 3 | Comparative Example 4 | Comparative Example 5 |
|---|---|---|---|---|---|---|
| Adhesive layer (A1L) | Formulation | 1 | 1 | 5 | 6 | 2 |
|  | tan δ peak temperature | 46° C./48° C. | 46° C./48° C. |  | −3° C./ | 46° C./48° C. |
|  | Foaming agent | Present | Present | Present | Present | Absent |
| Tackiness agent region (A2R) | Shape | Entire surface | — | — | — | Entire surface |
|  | Area (%) | 100% | 0% | 0% | 0% | 100% |
|  | Location | Single surface | — | — | — | Single surface |

TABLE 4-continued

| | | Comparative Example 1 | Comparative Example 2 | Comparative Example 3 | Comparative Example 4 | Comparative Example 5 |
|---|---|---|---|---|---|---|
| Releasing layer | | Absent | Absent | Absent | Absent | Absent |
| Substrate | | Present | Present | Present | Present | Present |
| Drawing | | — | — | — | — | — |
| Evaluation results | Low-temperature sticking property | PASS | FAIL | PASS | PASS | PASS |
| | Adhesiveness maintenance rate (200° C.) | 66% | — | — | — | 31% |
| | Resin flow resistance [mm] | 0 | 0 | — | 0.95 | 0 |
| | Life | PASS | — | FAIL | PASS | PASS |

As is evident from the evaluation results in Tables 2 to 4, all characteristics were excellent in Examples 1 to 10, in which the adhesive sheets of the present invention were used.

Meanwhile, the adhesive sheet of Comparative Example 1, in which the tackiness agent (A2) was entirely applied, exhibited a lower adhesiveness maintenance rate (200° C.) and inferior heat resistance compared to the adhesive sheets of Examples 1 to 3, in which the tackiness agent regions (A2R) were partially provided on top of the adhesive layer (A1L) with the same formulation. Similarly, the adhesive sheet of Comparative Example 5 exhibited a lower adhesiveness maintenance rate (200° C.) and inferior heat resistance compared to the adhesive sheet of Example 4. This is thought to be because, in a case where there is no adhesive-layer-exposed region (A1LR) as in the adhesive sheets of Comparative Examples 1 and 5, the fluidity of the adhesive is hindered at the time of heat curing, making it difficult for the adhesive to reach the adherend and preventing stable and high adhesive strength from being obtained.

In contrast, of the adhesive sheets of Comparative Examples 2 to 4, for which no tackiness agent (A2) was provided, Comparative Example 2 exhibited an inferior low-temperature sticking property (temporary fixability). This is thought to be because the adhesive (formulation 1), which is in solid form and exhibits no tack at 5° C., was used for the adhesive layer (A1L). Meanwhile, since the adhesive sheets of Comparative Examples 3 and 4 used the adhesives (formulations 5 and 6), which exhibit tack at 5° C., they had an excellent low-temperature sticking property (temporary fixability) even without the tackiness agent regions (A2R). However, the adhesive sheet of Comparative Example 3 had inferior life (low-temperature sticking property after storage at 40° C. for 1 day). This is thought to be because the adhesive of formulation 5 uses an epoxy resin that is polyfunctional and highly reactive. In addition, the adhesive sheet of Comparative Example 4 had inferior resin flow resistance. This is thought to be because the peak temperature of tan δ of the adhesive of formulation 6 is as low as −3° C., resulting in poor shape stability.

INDUSTRIAL APPLICABILITY

The adhesive sheet of the present invention is excellent in handleability since it has the tackiness force necessary for temporary fixation at the time of sticking, and also maintains stable and high adhesive strength after heat curing, resulting in excellent heat resistance. Accordingly, it is useful in, for example, applications where one industrial component is inserted into a narrow section of another industrial component and fixed by adhesion.

REFERENCE SIGNS LIST

A1L adhesive layer
A2R tackiness agent region
A1LR adhesive-layer-exposed region
10 substrate
11 releasing layer

The invention claimed is:

1. An adhesive sheet comprising
an adhesive layer (A1L) including an epoxy resin and thermosensitive foaming agent that contains thermally expandable microcapsules,
wherein the adhesive layer (A1L) has a peak temperature of a loss factor (tan δ) equal to or more than 18° C.,
wherein at least one surface of the adhesive layer (A1L) has a tackiness agent region (A2R) formed by partially providing a tackiness agent (A2),
wherein the tackiness agent (A2) is selected from a group of acrylic tackiness agents, rubber-based tackiness agents, silicone-based tackiness agents and a combination of two or more among acrylic tackiness agents, rubber-based tackiness agents, and silicone-based tackiness agents,
wherein a region where the tackiness agent region (A2R) is not formed on the surface is an adhesive-layer-exposed region (A1LR) where a surface of the adhesive layer (A1L) is exposed, and
the loss factor (tan δ) is defined by following formula (1):

$$\tan \delta = G''/G' \tag{1},$$

wherein storage modulus G' and loss modulus G" are measured with a dynamic viscoelasticity measurement tester for a 2-mm thickness adhesive sample at a frequency of 10 Hz and at −20° C. to 100° C. in a condition where the 2-mm thickness adhesive sample is sandwiched between parallel plates provided in a measurement section of the dynamic viscoelasticity measurement tester,
wherein the tackiness agent region (A2R) is temporarily fixed to an adherend before the adhesive sheet is heated, and then the adhesive layer (A1L) foams when the adhesive sheet is heated, and the foamed adhesive layer (A1L) comes into contact with the adherend after the adhesive sheet is heated.

2. An adhesive sheet according to claim 1, wherein the adhesive layer (A1L) exhibits no tack at 5° C.

3. An adhesive sheet according to claim 1, wherein a proportion of an area of the tackiness agent region (A2R) to a total area (100%) of an area of the tackiness agent region (A2R) and an area of the adhesive-layer-exposed region (A1LR) is 1% to 70%.

4. An adhesive sheet according to claim 1, wherein the adhesive layer (A1L) contains a thermosensitive foaming agent.

5. An adhesive sheet according to claim 1, wherein an outer surface of the tackiness agent region (A2R) protrudes outward compared to an outer surface of the adhesive-layer-exposed region (A1LR).

6. An adhesive sheet according to claim 1, wherein an outer surface of the tackiness agent region (A2R) and an outer surface of the adhesive-layer-exposed region (A1LR) are present in substantially a same plane.

7. An adhesive sheet according to claim 1, wherein the one surface of the adhesive layer (A1L) has the tackiness agent region (A2R) and another surface of the adhesive layer (A1L) has a substrate.

8. An adhesive sheet according to claim 1, which has a low-temperature sticking property such that when a 20-mm square sheet of the adhesive layer (A1L) is pressed onto a polished SUS plate with a 2-kg roller in 10 seconds, the 20-mm square sheet of the adhesive layer (A1L) does not fall off in a temporary fixability test condition where the polished SUS (Steel Use Stainless) plate is lifted and turned over at 5° C.

\*　　\*　　\*　　\*　　\*